United States Patent
Arnitz et al.

(10) Patent No.: US 10,530,194 B2
(45) Date of Patent: Jan. 7, 2020

(54) SYSTEM AND METHODS FOR REDUCING SCATTERING, REFLECTION OR RE-RADIATION OF RECEIVED RF ENERGY

(71) Applicant: Searete LLC, Bellevue, WA (US)

(72) Inventors: Daniel Arnitz, Seattle, WA (US); Joseph Hagerty, Seattle, WA (US); Russell J. Hannigan, Sammamish, WA (US); Guy S. Lipworth, Seattle, WA (US); Matthew S. Reynolds, Seattle, WA (US); Yaroslav A. Urzhumov, Bellevue, WA (US)

(73) Assignee: The Invention Science Fund I LLC, Bellevue, WA (US)

( * ) Notice: Subject to any disclaimer, the term of this patent is extended or adjusted under 35 U.S.C. 154(b) by 171 days.

(21) Appl. No.: 15/839,007

(22) Filed: Dec. 12, 2017

(65) Prior Publication Data
US 2019/0181696 A1    Jun. 13, 2019

(51) Int. Cl.
| | |
|---|---|
| *H02J 50/70* | (2016.01) |
| *H01Q 21/29* | (2006.01) |
| *H02J 50/20* | (2016.01) |
| *H02J 50/40* | (2016.01) |
| *H01Q 1/24* | (2006.01) |
| *H02J 50/27* | (2016.01) |
| *H02J 50/23* | (2016.01) |

(52) U.S. Cl.
CPC ............ *H02J 50/70* (2016.02); *H01Q 1/248* (2013.01); *H01Q 21/29* (2013.01); *H02J 50/20* (2016.02); *H02J 50/23* (2016.02); *H02J 50/27* (2016.02); *H02J 50/40* (2016.02)

(58) Field of Classification Search
CPC ............ H02J 50/70; H02J 50/40; H02J 50/20; H01Q 21/29; H01Q 1/248
See application file for complete search history.

(56) References Cited

U.S. PATENT DOCUMENTS

| | | |
|---|---|---|
| 6,643,137 B1 | 11/2003 | Chung et al. |
| 9,912,199 B2 * | 3/2018 | Leabman ............... A41D 1/002 |

(Continued)

OTHER PUBLICATIONS

Joseph F. White, Member, IEEE, (Invited Paper), Diode Phase Shifters for Array Antennas, IEEE Transactions on Microwave Theory and Techniques, vol. MTT-22, No. 6, Jun. 1974, pp. 658-674.

(Continued)

*Primary Examiner* — Jared Fureman
*Assistant Examiner* — Duc M Pham

(57) ABSTRACT

According to various embodiments, a non-linear RF receiver including non-linear components is configured to receive RF energy. The non-linear RF receiver is coupled to an array of RF antennas having configuration parameters that vary across the array. The varied configuration parameters can be selected to reduce an amount of RF energy that is scatter, reflected, or re-radiated by the array in response to incident RF energy at the array of RF antennas. In various embodiments, the non-linear components of the non-linear RF receiver can have non-linear component configuration parameters that vary across the non-linear receiver. The varied non-linear component parameters can be selected to reduce an amount of RF energy that is re-radiated in response to incident RF energy.

43 Claims, 6 Drawing Sheets

(56) References Cited

U.S. PATENT DOCUMENTS

| | | | |
|---|---|---|---|
| 10,230,266 B1* | 3/2019 | Leabman | H02J 17/00 |
| 2003/0184969 A1 | 10/2003 | Itabashi et al. | |
| 2004/0189473 A1* | 9/2004 | Mickle | G06K 7/0008 |
| | | | 340/572.4 |
| 2006/0232359 A1 | 10/2006 | Fukuda et al. | |
| 2010/0069011 A1 | 3/2010 | Carrick et al. | |
| 2011/0199920 A1* | 8/2011 | Takei | G01S 13/767 |
| | | | 370/252 |
| 2012/0188723 A1 | 7/2012 | Liu et al. | |
| 2012/0217926 A1 | 8/2012 | Yoon et al. | |
| 2013/0003306 A1 | 1/2013 | Oota et al. | |
| 2013/0207274 A1 | 8/2013 | Liu et al. | |
| 2014/0009889 A1 | 1/2014 | Lee et al. | |
| 2015/0236395 A1 | 8/2015 | Analui et al. | |
| 2015/0270821 A1 | 9/2015 | Natarajan et al. | |
| 2017/0179766 A1* | 6/2017 | Zeine | H02J 50/80 |
| 2018/0166924 A1* | 6/2018 | Hosseini | H02J 50/20 |

OTHER PUBLICATIONS

David M. Pozar, Microwave Engineering, 4th Ed, Wiley, John Wiley & Sons, Inc., Nov. 2011, ©2012, 756 pages.

M. Schuhler, C. Schmidt, J. Wansch, and M.A. Hein, Phase Shifters based on PIN-Diodes and Varactors: Two Concepts by Comparison, IWK, International Wissenschaftliches Kolloquium, International Scientific Colloquium, Proceedings, Facity of Electrical Engineering and Information Science, Information Technology and Electrical Engineering—Devices and Systems, Materials and Technologies for the Future, Sep. 11-15, 2006, 18 pages.

Skyworks, Application Note, A Varactor Controlled Phase Shifter for PCS Base Station Applications, Aug. 13, 2009, pp. 1-9.

* cited by examiner

602 — PROCESS INCIDENT RF ENERGY BY A NON-LINEAR RF RECEIVER HAVING NON-LINEAR COMPONENTS WITH NON-LINEAR COMPONENT CONFIGURATION PARAMETERS THAT VARY ACROSS THE NON-LINEAR RF RECEIVER TO REDUCE AN AMOUNT OF POTENTIAL RF ENERGY CAPABLE OF BEING RE-RADIATED FROM THE INCIDENT RF ENERGY

604 — REDUCE AN AMOUNT OF RF ENERGY THAT IS ACTUALLY RE-RADIATED FROM THE AMOUNT OF POTENTIAL RF ENERGY BY AN ARRAY OF RF ANTENNAS HAVING ANTENNA CONFIGURATION PARAMETERS THAT VARY ACROSS THE ARRAY TO FURTHER REDUCE THE AMOUNT OF RF ENERGY THAT IS ACTUALLY RE-RADIATED BY THE ARRAY OF RF ANTENNAS

SYSTEM AND METHODS FOR REDUCING SCATTERING, REFLECTION OR RE-RADIATION OF RECEIVED RF ENERGY

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application. All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to reducing one or a combination of scattering, reflection, and re-radiation of incident radio frequency (herein referred to as "RF") energy at an RF receiver system. Specifically, this disclosure relates to varying either or both configurations parameters of an array of RF antennas coupled to a non-linear RF receiver or configuration parameters of non-linear components of the non-linear RF receiver to reduce one or a combination of scattering, reflection, and re-radiation of incident RF energy.

SUMMARY

According to various embodiments, a system comprises an array of RF antennas coupled to a non-linear RF receiver including non-linear components. The array of RF antennas can have configuration parameters that vary across the array. The varied configuration parameters across the array of RF antennas can be selected to reduce one or a combination of an amount of RF energy that is scattered from incident RF energy, an amount of RF energy that is reflected from the incident RF energy, and an amount of RF energy that is re-radiated by the array of RF antennas in response to the incident RF energy.

In various embodiments, incident RF energy is received at an array of RF antennas. The array of RF antennas can have configuration parameters that vary across the array. The varied configuration parameters of the array of RF antennas can be selected to reduce one or a combination of an amount of RF energy that is scattered from the incident RF energy, an amount of RF energy that is reflected from the incident RF energy, and an amount of RF energy that is re-radiated from the incident RF energy. The incident RF energy can subsequently be processed by a non-linear RF receiver including non-linear components that is coupled to the array of RF antennas.

In certain embodiments, a system comprises an array of RF antennas. The array of RF antennas is coupled to a non-linear RF receiver. The non-linear RF receiver includes non-linear components with non-linear component configuration parameters that vary across the non-linear RF receiver. The varying non-linear component configuration parameters can be selected to reduce an amount of RF energy that is re-radiated in response to incident RF energy.

In various embodiments, incident RF energy is received at an array of RF antennas. The incident RF energy can subsequently be processed by a non-linear RF receiver coupled to the array of RF antennas. The non-linear RF receiver can have non-linear components with non-linear component configuration parameters that vary across the non-linear RF receiver. The non-linear component configuration parameters can be selected to reduce an amount of RF energy that is re-radiated by the array in response to incident RF energy.

BRIEF DESCRIPTION OF THE DRAWINGS

FIG. 6 is a flowchart of an example method of operating an RF receiver system to reduce, in steps, an amount of RF energy that is actually re-radiated by an RF receiver system.

DETAILED DESCRIPTION

Figure 1:
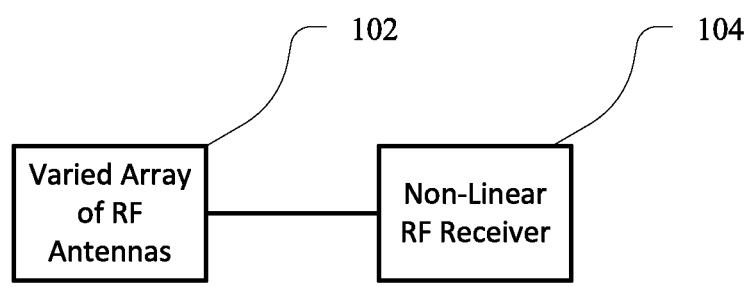
FIG. 1 illustrates an example RF receiver system.

In certain embodiments, a system comprises an array of RF antennas coupled to a non-linear RF receiver including non-linear components. The array of RF antennas can have configuration parameters that vary across the array. The varied configuration parameters across the array of RF antennas can be selected to reduce one or a combination of an amount of RF energy that is scattered from incident RF energy, an amount of RF energy that is reflected from the incident RF energy, and an amount of RF energy that is re-radiated by the array of RF antennas in response to the incident RF energy.

In various embodiments, incident RF energy is received at an array of RF antennas. The array of RF antennas can have configuration parameters that vary across the array. The varied configuration parameters of the array of RF antennas can be selected to reduce one or a combination of an amount of RF energy that is scattered from the incident RF energy, an amount of RF energy that is reflected from the incident RF energy, and an amount of RF energy that is re-radiated from the incident RF energy. The incident RF energy can subsequently be processed by a non-linear RF receiver including non-linear components that is coupled to the array of RF antennas.

In certain embodiments, a system comprises an array of RF antennas. The array of RF antennas is coupled to a non-linear RF receiver. The non-linear RF receiver includes non-linear components with non-linear component configuration parameters that vary across the non-linear RF receiver. The varying non-linear component configuration parameters can be selected to reduce an amount of RF energy that is re-radiated in response to incident RF energy.

In various embodiments, incident RF energy is received at an array of RF antennas. The incident RF energy can subsequently be processed by a non-linear RF receiver coupled to the array of RF antennas. The non-linear RF receiver can have non-linear components with non-linear component configuration parameters that vary across the non-linear RF receiver. The non-linear component configuration parameters can be selected to reduce an amount of RF energy that is re-radiated by the array in response to incident RF energy.

The example RF receivers, controllers, and systems shown herein can be configured to or included as part of systems configured to wirelessly receive power using RF signals. Specifically, the RF receivers can be used to generate power from received RF energy as part of wirelessly receiving power using the RF signals. More specifically, the RF receivers can generate, from received RF energy, direct current voltage to power devices coupled to or incorporating the RF receivers.

Further, received RF energy can be part of a steerable beam of RF energy, e.g. as part of an energy carrying signal at a specific RF frequency or within a specific RF frequency band. Specifically, received RF energy can be transmitted using a phased array of antennas. A beam of RF energy used to transmit RF energy to RF receiver systems described herein can be steered based on a position of the RF receiver systems. More specifically, an RF receiver system can move, e.g. be integrated as part of a moving device, and a beam of RF energy can be steered towards an RF receiver system as the RF receiver system moves in space.

Some of the infrastructure that can be used with embodiments disclosed herein is already available, such as general-purpose computers, RF antennas, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example RF receiver system 100. The example RF receiver system 100 shown in FIG. 1 can be configured to receive incident RF energy from an RF transmitter system. The RF receiver system 100 can subsequently process the incident RF energy, e.g. as it is received at the RF receiver system 100. The example RF receiver system 100 shown in FIG. 1 includes a varied array of RF antennas 102 and a non-linear RF receiver 104.

The varied array of RF antennas 102 is configured to receive incident RF energy. The varied array of RF antennas 102 can receive incident RF energy as propagating radio waves in the form of one or a combination of a continuous wave, modulated waves, pulsed waves, time-harmonic waves, and time-varying waves. Additionally, the varied array of RF antennas 102 can include an applicable number of antennas to form the array. Further, the varied array of RF antennas 102 can be fabricated from one or more applicable antenna materials. More specifically, the varied array of RF antennas 102 can be fabricated from one or more electrically conductive materials to facilitate absorption and transmission of incident RF energy. Absorbed incident RF energy, as used herein, can include RF energy that is absorbed at the RF antennas without being scattered or reflected at the antennas.

The varied array of RF antennas 102 is varied in that it has antenna configuration parameters that vary across the varied array of RF antennas 102. Antenna configuration parameters include applicable parameters of antennas that define antennas based on one or a combination of shape, design, position, and operation of the antennas to receive incident RF energy. Additionally, antenna configuration parameters can include applicable parameters of antennas across an array of antennas. For example, an antenna configuration parameter of a first antenna in an array can depend on a relation or a reference by the first antenna to a second antenna in the array.

In having varied antenna configuration parameters across an array of RF antennas, the varied array of RF antennas 102 can reduce an amount of RF energy that is scattered by the RF receiver system 100 in response to incident RF energy. The varied array of RF antennas 102 can reduce an amount of RF energy scattered by the RF receiver system 100 with respect to an RF receiver system that lacks a varied array of RF antennas. RF energy scattered from incident RF energy, as used herein, includes RF energy that is scattered through diffuse reflection as the incident RF energy contacts or interacts with a surface, e.g. of one or more antennas in the varied array of RF antennas 102. More specifically, RF energy scattered from incident RF energy can include RF energy that is scattered at many angles from a surface as opposed to RF energy that is reflected at a single angle from the surface.

Further, in having varied antenna configuration parameters across an array of RF antennas, the varied array of RF antennas 102 can reduce an amount of RF energy that is reflected by the RF receiver system 100 in response to incident RF energy. The varied array of RF antennas 102 can reduce an amount of RF energy reflected by the RF receiver system 100 with respect to an RF receiver system that lacks a varied array of RF antennas. RF energy reflected from incident RF energy, as used herein, includes RF energy that is reflected through specular reflection as the incident RF energy contacts or interacts with a surface, e.g. of one or more antennas in the varied array of RF antennas 102. More specifically, RF energy reflected from incident RF energy can include RF energy that is reflected at one angle from a surface as opposed to RF energy that is scattered at multiple angles from the surface.

Additionally, in having varied antenna configuration parameters across an array of RF antennas, the varied array of RF antennas 102 can reduce an amount of RF energy that is re-radiated by the RF receiver system 100 in response to incident RF energy. The varied array of RF antennas 102 can reduce an amount of RF energy re-radiated by the RF receiver system 100 with respect to an RF receiver system that lacks a varied array of RF antennas. RF energy re-radiated from incident RF energy, as used herein, includes RF energy that is emitted by an antenna in response to incident RF energy that is absorbed by the antenna. More specifically, the antenna can act as a receiving antenna by absorbing incident RF energy and also act as a transmitting antenna by transmitting RF energy re-radiated from the absorbed incident RF energy.

RF energy re-radiated from incident RF energy can include either or both portions of the incident RF energy that is absorbed by an antenna and RF energy that is generated from the absorbed RF energy. More specifically, re-radiated RF energy can include RF energy that is generated through processing of absorbed incident RF energy, e.g. by the non-linear components of the non-linear RF receiver 104. For example, re-radiated RF energy can be created from harmonics generated by processing absorbed incident RF energy at non-linear components in the non-linear RF receiver 104. In another example, re-radiated RF energy can be created from intermodulation of signals generated by processing absorbed incident RF energy of different frequencies at non-linear components in the non-linear RF receiver.

The varied array of RF antennas 102 can have varied antenna configuration parameters that increases an amount of destructive interference between either or both scattered RF energy and reflected RF energy in response to incident RF energy. More specifically, the varied array of RF antennas 102 can increase an amount of destructive interference between either or both waves of RF energy that are scattered from incident RF energy and waves of RF energy that are reflected from incident RF energy. By increasing an amount of destructive interference between scattered and reflected RF energy, a total amount of RF energy that is either or both scattered and reflected from incident RF energy by the varied array of RF antennas 102 can be reduced. Specifically, by increasing an amount of destructive interference between scattered and reflected waves of RF energy, a total amount of RF energy that is scattered and reflected from incident RF energy by multiple portions of the varied array of RF antennas 102 can be reduced.

Further, varied antenna configuration parameters of the varied array of RF antennas 102 can increase an amount of destructive interference between either or both scattered and reflected RF energy to the point where either or both scattered and reflected waves of RF energy cancel each other out. More specifically, varied antenna configuration parameters of the varied array of RF antennas 102 can cause waves of RF energy either or both scattered and reflected from incident waves of RF energy to cancel each other out across multiple portions of the varied array of RF antennas 102. This can lead to a reduction in a total amount of RF energy either or both scattered and reflected by the varied array of RF antennas 102 from incident RF energy.

Additionally, the varied array of RF antennas 102 can have varied antenna configuration parameters that decreases an amount of constructive interference between either or both scattered RF energy and reflected RF energy in response to incident RF energy. More specifically, the varied array of RF antennas 102 can decrease an amount of constructive interference between waves of RF energy that are either or both scattered from incident RF energy and reflected from incident RF energy. By decreasing an amount of constructive interference between scattered and reflected RF energy, a total amount of RF energy that is either or both scattered and reflected from incident RF energy by the varied array of RF antennas 102 can be reduced. Specifically, by decreasing an amount of constructive interference between scattered and reflected RF energy, a total amount of RF energy that is scattered and reflected from incident RF energy by multiple portions of the varied array of RF antennas 102 can be reduced.

Varied antenna configuration parameters of the varied array of RF antennas 102 can include varied physical positions of the RF antennas within the varied array of RF antennas 102. Specifically, antennas in the varied array of RF antennas 102 can be displaced at different positions with respect to each other to vary physical positions of the RF antennas within the varied array of RF antennas 102. Further, antennas in the varied array of RF antennas 102 can have different orientations with respect to each other to vary physical positions of the RF antennas within the varied array of RF antennas 102. By varying physical positions of the RF antennas within the varied array of RF antennas 102, destructive interference between waves of RF energy either or both scattered or reflected from incident RF energy can be increased. Further, by varying physical positions of the RF antennas within the varied array of RF antennas 102, constructive interference between waves of RF energy either or both scattered or reflected from incident RF energy can be decreased. As a result, a total amount of RF energy either or both scattered and reflected from incident RF energy by the varied array of RF antennas 102 can be decreased.

Heights of RF antennas in the varied array of RF antennas 102 can be varied across the array to vary physical positions of the RF antennas within the varied array of RF antennas 102. More specifically, heights of RF antennas in the varied array of RF antennas 102 with respect to a reference point or plane can be varied across the varied array of RF antennas 102. For example, a plane can extend across all or a portion of a footprint or base of the varied array of RF antennas 102 and heights of RF antennas in the array with respect to the plane can be varied across the RF antennas to vary physical positions of the RF antennas within the varied array of RF antennas 102. Further in the example, the heights of the RF antennas in a direction orthogonal to the plane can be varied to vary physical positions of the RF antennas within the varied array of RF antennas 102.

Varied antenna configuration parameters of the varied array of RF antennas 102 can include varied polarizations of RF antennas within the varied array of RF antennas 102. For example a first antenna in the varied array of RF antennas 102 can be horizontally polarized with respect to a fixed reference point or plane while a second antenna in the varied array of RF antennas 102 can be vertically polarized with respect to the fixed referent point or plane. RF antennas in the varied array of RF antennas 102 can have varied polarizations with respect to each other. For example, a first antenna in the varied array of RF antennas 102 can be polarized 90° with respect to a second antenna in the varied array of RF antennas 102. By varying polarizations of the RF antennas within the varied array of RF antennas 102, destructive interference between waves of RF energy either or both scattered or reflected from incident RF energy can be increased. Further, by varying polarization of the RF antennas within the varied array of RF antennas 102, constructive interference between waves of RF energy either or both scattered or reflected from incident RF energy can be decreased. As a result, a total amount of RF energy either or both scattered and reflected from incident RF energy by the varied array of RF antennas 102 can be decreased.

Varied antenna configuration parameters of the varied array of RF antennas 102 can reduce an amount of RF energy that is re-radiated from incident RF energy. Specifically, varying antenna configuration parameters of the varied array of RF antennas 102 can increase an amount of destructive interference between waves of RF energy that are re-radiated from incident RF energy. By increasing an amount of destructive interference between waves of re-radiated RF energy, a total amount of RF energy that is re-radiated by the varied array of RF antennas 102 can be reduced. Specifically, by increasing an amount of destructive interference between waves of re-radiated RF energy, a total amount of RF energy that is re-radiated from incident RF energy by multiple portions of the varied array of RF antennas 102 can be reduced.

Further, varied antenna configuration parameters of the varied array of RF antennas 102 can increase an amount of destructive interference between re-radiated RF energy to the point where waves of re-radiated RF energy cancel each other out. More specifically, varied antenna configuration parameters of the varied array of RF antennas 102 can cause waves of RF energy re-radiated from incident waves of RF energy to cancel each other out across multiple portions of the varied array of RF antennas 102. This can lead to a reduction in a total amount of RF energy re-radiated by the varied array of RF antennas 102 from incident RF energy.

Additionally, the varied array of RF antennas 102 can have varied antenna configuration parameters that decreases an amount of constructive interference between RF energy re-radiated in response to incident RF energy. More specifically, the varied array of RF antennas 102 can decrease an amount of constructive interference between waves of RF energy that are re-radiated from incident RF energy. By decreasing an amount of constructive interference between re-radiated RF energy, a total amount of RF energy that is re-radiated from incident RF energy by the varied array of RF antennas 102 can be reduced. Specifically, by decreasing an amount of constructive interference between waves of re-radiated RF energy, a total amount of RF energy that is re-radiated from incident RF energy by multiple portions of the varied array of RF antennas 102 can be reduced.

Varied antenna configuration parameters of the varied array of RF antennas 102 to reduce re-radiated RF energy can include varied physical positions of the RF antennas within the varied array of RF antennas 102. For example, positions and orientations of the RF antennas within the varied array of RF antennas in the varied array of RF antennas 102 can reduce an amount of constructive interference between waves of re-radiated RF energy and/or increase an amount of destructive interference between the waves of re-radiated RF energy. Further, the varied antenna configuration parameters of the varied array of RF antennas 102 to reduce re-radiated RF energy can include varied RF antenna polarizations. For example, polarizations of the RF antennas forming the varied array of RF antennas 102 can be varied to reduce an amount of constructive interference between waves of re-radiated RF energy and/or increase an amount of destructive interference between the waves of re-radiated RF energy.

The non-linear RF receiver 104 is an applicable device for processing incident radiation absorbed by the varied array of RF antennas 102. The non-linear RF receiver 104 can include one or a plurality of applicable components for processing incident RF energy absorbed by the varied array of RF antennas 102. More specifically, the non-linear RF receiver 104 can include either or both linear and non-linear components for processing incident RF energy absorbed by the varied array of RF antennas 102. For example, the non-linear RF receiver can include a plurality of electronic components for processing absorbed incident RF energy whose output is a linear function of the absorbed incident RF energy, e.g. parameters of the electronic components remain fixed. In another example, the non-linear RF receiver can include a plurality of electronic components, e.g. power rectifying components, for processing absorbed incident RF energy whose output is a non-linear functions of the absorbed incident RF energy, e.g. parameters of the electronic components vary.

The varied array of RF antennas 102 can be coupled to the non-linear RF receiver 104 through a plurality of transmission lines. Accordingly, the plurality of transmission lines can be configured to transmit absorbed incident RF energy from the varied array of RF antennas 102 to the non-linear RF receiver 104. The transmission lines coupling the varied array of RF antennas 102 to the non-linear RF receiver 104 can be formed by an applicable material in an applicable medium. For example, the plurality of transmission lines can be formed as a plurality of electrically conductive microstrips printed onto a printed circuit board. Each transmission line can correspond to a single antenna of the varied array of RF antennas 102. Thereby, each antenna in the varied array of RF antennas 102 can transmit absorbed incident RF energy to the non-linear RF receiver independent from other antennas in the varied array of RF antennas 102.

Figure 2:
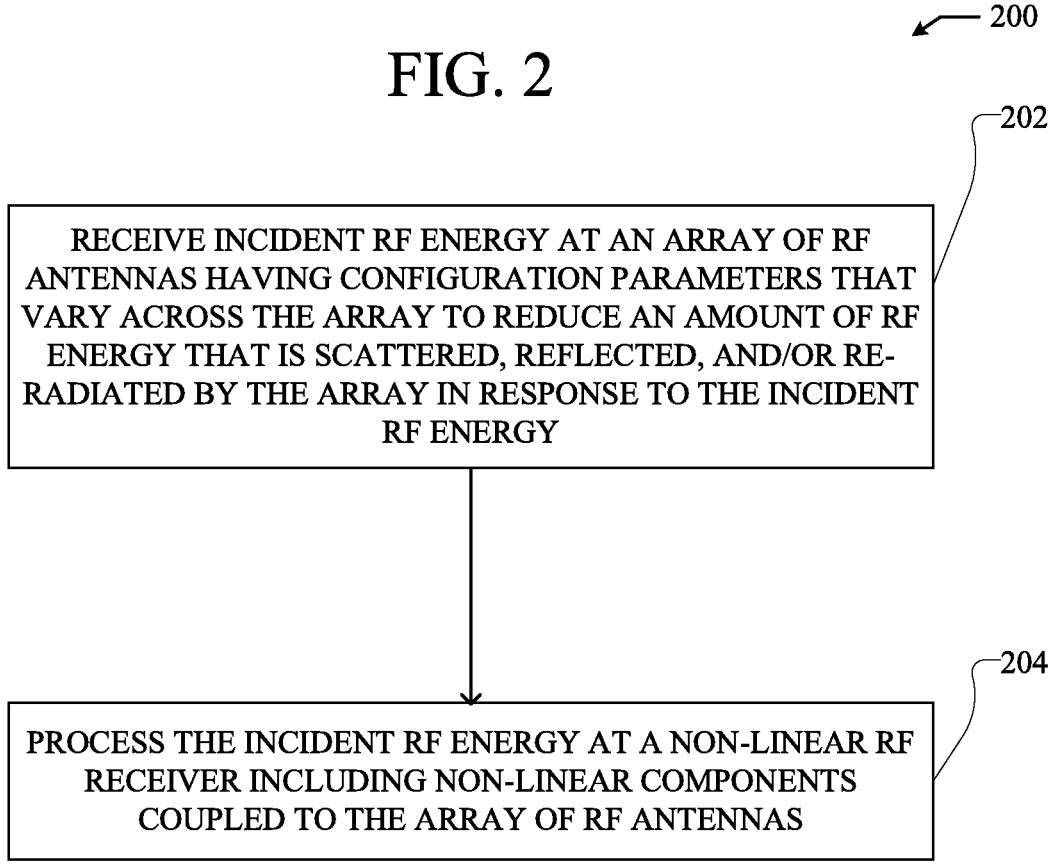
FIG. 2 is a flowchart of an example method of operating an RF receiver system to reduce one or a combination of an amount of RF energy that is scattered, reflected, or re-radiated by the RF receiver system.

FIG. 2 is a flowchart 200 of an example method of operating an RF receiver system to reduce one or a combination of an amount of RF energy that is scattered, reflected, or re-radiated by the RF receiver system. The example method shown in FIG. 2 can be performed by an applicable RF receiver system for reducing one or a combination of an amount of RF energy that is scattered, reflected or re-radiated by the RF receiver system, such as the example RF receiver system 100 shown in FIG. 1.

At step 202, incident RF energy is received at an array of RF antennas having configuration parameters that vary across the array to reduce an amount of RF energy that is scattered, reflected, and/or re-radiated by the array in response to the incident RF energy. Incident RF energy can be received at an applicable array of RF antennas having varied antenna configuration parameters, such as the varied array of RF antennas 102 in the example RF receiver system 100 shown in FIG. 1. Varied antenna configuration parameters of the array of RF antennas can include either or both varied positions and orientations of RF antennas in the array of RF antennas and varied polarizations of the RF antennas in the array of RF antennas.

Varied antenna configuration parameters of the array of RF antennas receiving incident RF energy at step 202 can increase an amount of destructive interference between waves of RF energy scattered, reflected, and/or re-radiated in response to the incident RF energy at the array of RF antennas. More specifically, varied antenna configuration parameters of the array of RF antennas can increase an amount of destructive interference between waves of RF energy scattered, reflected, and/or re-radiated at the array of RF antennas to the point where the waves of RF energy cancel each other out. Further, varied antenna configuration parameters of the array of RF antennas can decrease an amount of constructive interference between waves of RF energy scattered, reflected, and/or re-radiated in response to the incident RF energy at the RF antennas.

At step 204, the incident RF energy is processed by a non-linear RF receiver including non-linear components coupled to the array of RF antennas. More specifically, incident RF energy absorbed by the array of RF antennas can be processed by the non-linear RF receiver. The non-linear RF receiver can be an applicable non-linear RF receiver including non-linear components for processing incident RF energy, such as the non-linear RF receiver 104 in the example RF receiver system 100 shown in FIG. 1. The non-linear RF receiver and the non-linear components can process the incident RF energy to provide power transmitted wirelessly through the incident RF energy to a device coupled to or otherwise integrated with the non-linear RF receiver. For example, the non-linear components can be power rectifying components configured to convert the incident RF energy into direct current voltage to power a device as part of processing the incident RF energy.

Figure 3:
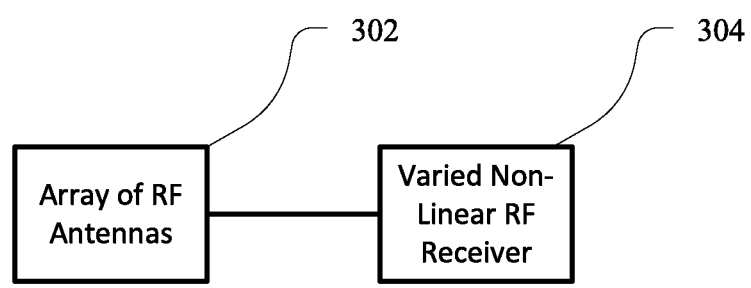
FIG. 3 illustrates another example RF receiver system.

FIG. 3 illustrates another example RF receiver system 300. The example RF receiver system 300 shown in FIG. 3 can be configured to receive incident RF energy from an RF transmitter system. The RF receiver system 300 can subsequently process the incident RF energy, e.g. as it is received at the RF receiver system 300 from an RF transmitter system. The example RF receiver system 300 shown in FIG. 1 includes an array of RF antennas and a varied non-linear RF receiver.

The array of RF antennas 302 is configured to receive incident RF energy. More specifically, the array of RF antennas 302 can receive incident RF energy as propagating radio waves in the form of one or a combination of a continuous wave, modulated waves, pulsed waves, time-harmonic waves, and time-varying waves. The array of RF antennas 302 can include an applicable number of antennas to form the array. Further, the array of RF antennas 302 can be fabricated from one or more applicable antenna materials. More specifically, the array of RF antennas 302 can be fabricated from one or more electrically conductive materials to facilitate absorption and transmission of incident RF energy.

The array of RF antennas 302 is coupled to the varied non-linear RF receiver 304. More specifically, the array of RF antennas 302 can transmit absorbed incident RF energy to the varied non-linear RF receiver for processing, e.g. as part of processing the incident RF energy. The array of RF antennas 302 can be coupled to the varied non-linear RF receiver 304 through a plurality of transmission lines used to transmit absorbed RF energy to the varied non-linear RF receiver 304. More specifically, each RF antenna in the array of RF antennas 302 can be coupled to the varied non-linear RF receiver 304 through a single transmission line unique to each RF antenna, thereby allowing each RF antenna to communicate with the varied non-linear RF receiver 304 independent of other RF antennas.

The varied non-linear RF receiver 304 functions to process incident RF energy absorbed and transmitted from the 302 array of RF antennas 302 to the varied non-linear RF receiver 304. Specifically, the varied non-linear RF receiver 304 can include non-linear components and potentially linear components configured to process RF energy received from the array of RF antennas 302. For example, the varied non-linear RF receiver 304 can include power rectifying components, e.g. non-linear components, configured to convert incident RF energy received from the array of RF antennas 302 into direct current voltage. Further in the example, the direct current voltage converted by the power rectifying components can be used to power a device coupled to or otherwise integrated with the varied non-linear RF receiver 304.

The varied non-linear RF receiver 304 is varied in that is has varied non-linear component configuration parameters across non-linear components of the varied non-linear RF receiver 304. Non-linear component configuration parameters include applicable parameters of non-linear components based on one or a combination of design, position, and operation of the non-linear components. Additionally, non-linear component configuration parameters can include applicable parameters of non-linear components across an array or plurality of non-linear components. For example, a non-linear component configuration parameter of a first non-linear component can depend on a non-linear component configuration parameters of a second non-linear component.

In having varied non-linear component configuration parameters across non-linear components, the varied non-linear RF receiver 304 can reduce an amount of RF energy that is re-radiated from incident RF energy by the RF receiver system 300. More specifically, the varied non-linear RF receiver 304 can reduce an amount of RF energy that is re-radiated by the array of RF antennas 302 in response to incident RF energy. Varied non-linear component configuration parameters across non-linear components of the varied non-linear RF receiver 304 can reduce an amount of absorbed incident RF energy that is subsequently re-radiated. Specifically, the varied non-linear RF receiver 304 can reduce an amount of RF energy that is re-radiated from incident RF energy as a result of transmitting RF energy absorbed by the array of RF antennas 302 to the varied non-linear RF receiver 304, e.g. through transmission lines.

The varied non-linear RF receiver 304 can reduce an amount of RF energy that is created and subsequently re-radiated from the RF receiver system 300 as a result of processing incident RF energy at the varied non-linear RF receiver 304. Specifically, varied non-linear component configuration parameters of the varied non-linear RF receiver 304 can reduce an amount of re-radiated energy that is caused by harmonics generated by processing incident RF energy at the varied non-linear RF receiver 304. Further, varied non-linear component configuration parameters of the varied non-linear RF receiver 304 can reduce an amount of re-radiated energy that is caused by intermodulation of signals generated by processing incident RF energy at the varied non-linear RF receiver 304.

Varied non-linear component configuration parameters of the varied non-linear RF receiver 304 can include varying arrangements of non-linear components in the varied non-linear RF receiver 304. Varying arrangements of non-linear components in the varied non-linear RF receiver 304 can include varying positions and orientations, e.g. with respect to each other, of the non-linear components in the varied non-linear RF receiver 304. For example, different non-linear components can be positioned in proximity to each other within the varied non-linear RF receiver 304 in order to create a varying arrangement of non-linear components. In another example, non-linear components can be positions at different orientations with respect to each other in the varied non-linear RF receiver 304 in order to create a varying arrangement of non-linear components. Further, varying arrangements of non-linear components in the varied non-linear RF receiver 304 can include varying polarities, e.g. with respect to each other, of the non-linear components in the varied non-linear RF receiver 304.

Additionally, varied non-linear component configuration parameters of the varied non-linear RF receiver 304 can include varying matches between non-linear components of the varied non-linear RF receiver 304 and RF antennas of the array of RF antennas 302. In turn, varying matches between non-linear components and RF antennas creates varying matchings between the plurality of non-linear components of the varied non-linear RF receiver 304 and the array of RF antennas 302. Matches between non-linear components of the varied non-linear RF receiver 304 and RF antennas of the array of RF antennas 302 can be created by varying characteristics of couplings between the non-linear components and the RF antennas. For example, lengths of transmission lines coupling RF antennas and non-linear components can be varied to create varying matchings between a plurality of non-linear components of the varied non-linear RF receiver 304 and the array of RF antennas 302.

Figure 4:
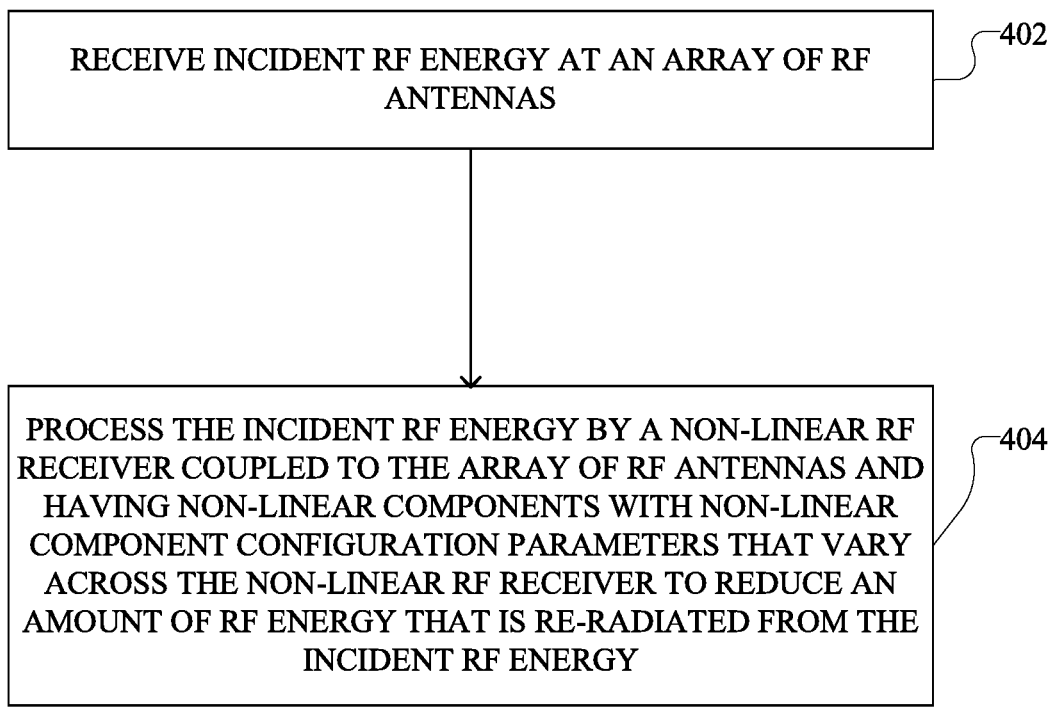
FIG. 4 is a flowchart of an example method of operating an RF receiver system to reduce an amount of RF energy that re-radiated by the RF receiver system.

FIG. 4 is a flowchart 400 of an example method of operating an RF receiver system to reduce an amount of RF energy that re-radiated by the RF receiver system. The example method shown in FIG. 4 can be performed by an applicable RF receiver system for reducing an amount of RF energy that is re-radiated by the RF receiver system, such as the example RF receiver system 300 shown in FIG. 3.

At step 402, incident RF energy is received at an array of RF antennas. Incident RF energy can be received at an applicable array of RF antennas, such as the array of RF antennas 302 in the example RF receiver system shown in FIG. 3. The RF antennas can include a repeated array of RF antennas that lack varied antenna configuration parameters. Incident RF energy received at the array of RF antennas that can be subsequently process can include incident RF energy that is absorbed by the array of RF antennas and exclude RF energy that is either or both scattered and reflected from the incident RF energy at the array of RF antennas.

At step 404, the incident RF energy, e.g. absorbed RF energy of the incident RF energy, is processed by a non-linear RF receiver coupled to the array of RF antennas. The non-linear RF receiver can be coupled to the array of RF antennas through a plurality of transmission lines. Additionally, the non-linear RF receiver includes a plurality of non-linear components with non-linear component configuration parameters that vary across the non-linear RF receiver to reduce an amount of RF energy that is re-radiated from the incident RF energy. The incident RF energy can be processed by an applicable non-linear RF receiver for reducing an amount of re-radiated RF energy from the incident RF energy, such as the varied non-linear RF receiver 304 in the example RF receiver system shown in FIG. 3.

The varied non-linear component configuration parameters of the non-linear components can reduce an amount of RF energy from the absorbed RF energy that is re-radiated through the array of RF antennas. Additionally, the varied non-linear component configuration parameters of the non-linear components can reduce an amount of RF energy that is generated as part of processing the absorbed RF energy and subsequently re-radiated through the array of RF antennas. The varied non-linear configuration parameters of the non-linear components can include either or both varied arrangements of the non-linear components and varying matches between the non-linear components and the array of RF antennas.

Figure 5:
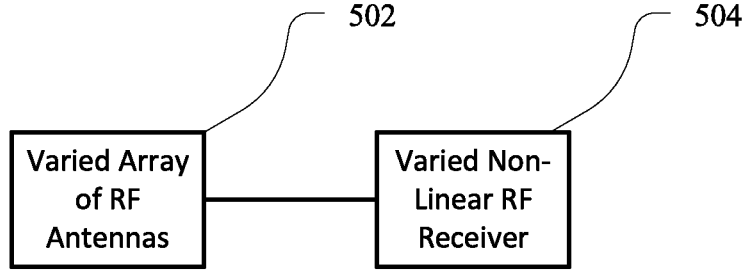
FIG. 5 illustrates an example RF receiver system configured to reduce an amount of RF energy scattered, reflected, and/or re-radiated from incident RF energy.

FIG. 5 illustrates an example RF receiver system 500 configured to reduce an amount of RF energy that is scattered, reflected, and/or re-radiated from incident RF energy. The example RF receiver system 500 shown in FIG. 5 includes a varied array of RF antennas 502 and a varied non-linear RF receiver 504. In the example RF receiver system 500 shown in FIG. 5, the varied array of RF antennas 502 can be coupled to the varied non-linear RF receiver 504 through transmission lines allowing for transmission of signals between the varied array of RF antennas 502 and the varied non-linear RF receivers 504.

The varied array of RF antennas 502 can be an applicable array of RF antennas with varied antenna configuration parameters, such as the varied array of RF antennas 102 in the example RF receiver system 100 shown in FIG. 1. Varied antenna configuration parameters of the varied array of RF antennas 502 can include either or both varied positions and orientations of RF antennas in the array of RF antennas and varied polarizations of the RF antennas in the array of RF antennas. For example, antennas in the varied array of RF antennas 502 can have different configurations with respect to each other to create non-uniformity in an antenna configuration pattern across the varied array of RF antennas 502.

Varied antenna configuration parameters of the varied array of RF antennas 502 can increase an amount of destructive interference between waves of RF energy scattered, reflected, and/or re-radiated in response to the incident RF energy at the array of RF antennas. More specifically, varied antenna configuration parameters of the varied array of RF antennas 502 can increase an amount of destructive interference between waves of RF energy scattered, reflected, and/or re-radiated at the array of RF antennas to the point where the waves of RF energy cancel each other out.

Further, varied antenna configuration parameters of the varied array of RF antennas 502 can decrease an amount of constructive interference between waves of RF energy scattered, reflected, and/or re-radiated in response to the incident RF energy at the RF antennas.

The varied non-linear RF receiver 504 can be an applicable receiver with non-linear components having varied non-linear component configuration parameters, such as such as the varied non-linear RF receiver 304 in the example RF receiver system 300 shown in FIG. 3. The varied non-linear component configuration parameters of the non-linear components can reduce an amount of RF energy from the absorbed RF energy that is re-radiated through the array of RF antennas. Additionally, the varied non-linear component configuration parameters of the non-linear components can reduce an amount of RF energy that is generated as part of processing the absorbed RF energy and subsequently re-radiated through the array of RF antennas. The varied non-linear configuration parameters of the non-linear components can include either or both varied arrangements of the non-linear components and varying matches between the non-linear components and the array of RF antennas.

The varied array of RF antennas 502 and the varied non-linear RF receiver 504 can work in combination to reduce a total amount of RF energy that is re-radiated by the RF receiver system 500. Specifically, varied non-linear component configuration parameters of non-linear components of the varied non-linear RF receiver 504 can reduce an amount of RF energy that is re-radiated out of the varied array of RF antennas 502. Further, varied antenna configuration parameters of RF antennas in the varied array of RF antennas 502 can either or both reduce constructive interference and increase destructive interference of the RF energy that is still re-radiated from the varied array of RF antennas 502. In turn, the varied non-linear RF receiver 504 can reduce an amount of re-radiated RF energy and the varied array of RF antennas 502 can further reduce an amount of re-radiated RF energy in addition to the reduction in re-radiated RF energy caused by the varied non-linear RF receiver 504.

FIG. 6 is a flowchart 600 of an example method of operating an RF receiver system to reduce, in steps, an amount of RF energy that is actually re-radiated by an RF receiver system. The example method shown in FIG. 6 can be performed by an applicable RF receiver system for reducing, in steps, an amount of RF energy that is re-radiated by the RF receiver system, such as the example RF receiver system 500 shown in FIG. 5.

At step 602, incident RF energy, e.g. absorbed RF energy of incident RF energy, is processed by a non-linear RF receiver including a plurality of non-linear components with varying non-linear component configuration parameters. The incident RF energy can be processed by an applicable non-linear RF receiver for reducing an amount of re-radiated RF energy from the incident RF energy, such as the varied non-linear RF receiver 504 in the example RF receiver system shown in FIG. 5. The varying non-linear component configuration parameters can vary across the non-linear components to reduce an amount of potential RF energy capable of being re-radiated from the incident RF energy. More specifically, the varying non-linear component configuration parameters can vary across the non-linear components to reduce an amount of potential RF energy capable of being re-radiated from the incident RF energy by a variable array of RF antennas.

At step 604, an amount of RF energy that is actually re-radiated from the amount of potential RF energy capable of being re-radiated by a variable array of RF antennas is reduced. More specifically, the already reduced amount of potential RF energy capable of being re-radiated can be transmitted, at least in part, to the array of RF antennas. Subsequently, an amount of RF energy less than the amount of potential RF energy capable of being re-radiated can actually be re-radiated by the array of RF antennas. More specifically, the variable array of RF antennas can have antenna configuration parameters that vary across the array to further decrease an amount of RF energy that is actually re-radiated from the already reduced amount of potential RF energy capable of being re-radiated. The variable array of RF antennas can be an applicable array of RF antennas having varying antenna configuration parameters, such as the varied non-linear RF receiver 504 in the example RF receiver system shown in FIG. 5.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
   an array of RF antennas having configuration parameters that vary across the array; and
   a non-linear RF receiver including non-linear components coupled to the array of RF antennas;
   wherein the varied configuration parameters are selected to reduce an amount of RF energy that is scattered, reflected, or re-radiated by the array in response to incident RF energy.

2. The system of claim 1, wherein the non-linear RF receiver is configured to receive wirelessly transferred power through the incident RF energy and the non-linear components are power rectifying components configured to convert the incident RF energy into direct current voltage to power a device as part of processing the incident RF energy.

3. The system of claim 1, wherein scattered RF energy from the incident RF energy and reflected energy from the incident RF energy includes multiple waves radiating from multiple portions of the array and the varied configuration parameters of the array increases an amount of destructive interference between the multiple waves.

4. The system of claim 1, wherein the varied configuration parameters of the array include varying physical positions of the RF antennas within the array.

5. The system of claim 4, wherein the RF antennas in the array are positioned within a plane and heights of the RF antennas with respect to the plane along a direction orthogonal to the plane vary across the array in varying the physical positions of the RF antennas within the array.

6. The system of claim 1, wherein the varied configuration parameters of the array include varying polarizations of the RF antennas within the array.

7. The system of claim 1, wherein re-radiated RF energy from the incident RF energy includes multiple waves radiating from multiple portions of the array and the varied configuration parameters of the array decreases the re-radiated RF energy.

8. The system of claim 7, wherein the varied configuration parameters of the array increases an amount of destructive interference between the multiple waves.

9. The system of claim 8, wherein the varied configuration parameters of the array include varying physical positions of the RF antennas within the array.

10. The system of claim 9, wherein the RF antennas in the array are positioned within a plane and heights of the RF antennas with respect to the plane along a direction orthogonal to the plane vary across the array in varying the physical positions of the RF antennas within the array.

11. The system of claim 8, wherein the varied configuration parameters of the array include varying polarizations of the RF antennas within the array.

12. The system of claim 7, wherein the non-linear components of the non-linear RF receiver have varied non-linear component configuration parameters and the varied non-linear component configuration parameters reduces an amount of re-radiated RF energy in the multiple waves.

13. The system of claim 7, wherein the re-radiated RF energy from the incident RF energy is created from either or both harmonics generated by processing the incident RF energy at the non-linear components in the non-linear RF receiver or intermodulation of signals generated by processing the incident RF energy of different frequencies at the non-linear components in the non-linear RF receiver.

14. The system of claim 1, wherein the incident RF energy is received by the RF antennas in the array as propagating radio waves in the form of one or a combination of a continuous wave, modulated waves, pulsed waves, time-harmonic waves, time-harmonic waves, and time-varying waves.

15. A system comprising:
   an array of RF antennas; and
   a non-linear RF receiver coupled to the array of RF antennas and having non-linear components with non-linear component configuration parameters that vary across the non-linear RF receiver;
   wherein the varied non-linear component configuration parameters of the non-linear components are selected to reduce an amount of RF energy that is re-radiated by the array in response to incident RF energy.

16. The system of claim 15, wherein re-radiated RF energy from the incident RF energy includes multiple waves radiating from multiple portions of the array and the varied non-linear component configuration parameters of the non-linear components decreases an amount of re-radiated RF energy in the multiple waves.

17. The system of claim 16, wherein the varied non-linear component configuration parameters of the non-linear components include varying arrangements of the non-linear components in the non-linear RF receiver to create a varied arrangement of the non-linear components in the non-linear RF receiver to reduce the amount of re-radiated RF energy in the multiple waves.

18. The system of claim 17, wherein the varied arrangement include varying polarities of the non-linear components in the non-linear RF receiver.

19. The system of claim 16, wherein the varied non-linear component configuration parameters of the non-linear components include varying matchings between the non-linear components and the RF antennas in the array to create varied matchings between the non-linear components and the RF antennas in the array to reduce the amount of re-radiated RF energy in the multiple waves.

20. The system of claim 19, wherein the varied matchings includes varying lengths of transmission lines coupling the non-linear components and the RF antennas in the array.

21. The system of claim 20, wherein each antenna of the RF antennas in the array corresponds to at least one transmission line of the transmission lines.

22. The system of claim 16, wherein the re-radiated RF energy from the incident RF energy is created from either or both harmonics generated by processing the incident RF energy at the non-linear components in the non-linear RF receiver or intermodulation of signals generated by processing the incident RF energy of different frequencies at the non-linear components in the non-linear RF receiver.

23. The system of claim 15, wherein the incident RF energy is received by the RF antennas in the array as propagating radio waves in the form of one or a combination of a continuous wave, modulated waves, pulsed waves, time-harmonic waves, time-harmonic waves, and time-varying waves.

24. The system of claim 16, wherein the array of RF antennas have configuration parameters that vary across the array, and the varied configuration parameters of the array are selected to reduce the amount of re-radiated RF energy from the incident RF energy.

25. The system of claim 15, wherein the non-linear RF receiver is configured to receive wirelessly transferred power through the incident RF energy and the non-linear components are power rectifying components configured to convert the incident RF energy into direct current voltage to power a device as part of processing the incident RF energy.

26. A method comprising:
receiving incident RF energy at an array of RF antennas having configuration parameters that vary across the array, wherein the varied configuration parameters are selected to reduce an amount of RF energy that is scattered, reflected, or re-radiated by the array in response to the incident RF energy; and
processing the incident RF energy by a non-linear RF receiver including non-linear components coupled to the array of RF antennas.

27. The method of claim 26, wherein the non-linear RF receiver is configured to receive wirelessly transferred power through the incident RF energy and the non-linear components are power rectifying components configured to convert the incident RF energy into direct current voltage to power a device as part of processing the incident RF energy.

28. The method of claim 26, wherein scattered RF energy from the incident RF energy and reflected energy from the incident RF energy includes multiple waves radiating from multiple portions of the array and the varied configuration parameters of the array increases an amount of destructive interference between the multiple waves.

29. The method of claim 26, wherein the varied configuration parameters of the array include varying physical positions of the RF antennas within the array.

30. The method of claim 29, wherein the RF antennas in the array are positioned within a plane and heights of the RF antennas with respect to the plane along a direction orthogonal to the plane vary across the array in varying the physical positions of the RF antennas within the array.

31. The method of claim 26, wherein the varied configuration parameters of the array include varying polarizations of the RF antennas within the array.

32. The method of claim 26, wherein re-radiated RF energy from the incident RF energy includes multiple waves radiating from multiple portions of the array and the varied configuration parameters of the array decreases the re-radiated RF energy.

33. The method of claim 32, wherein the varied configuration parameters of the array increases an amount of destructive interference between the multiple waves.

34. The method of claim 33, wherein the varied configuration parameters of the array include varying physical positions of the RF antennas within the array.

35. The method of claim 34, wherein the RF antennas in the array are positioned within a plane and heights of the RF antennas with respect to the plane along a direction orthogonal to the plane vary across the array in varying the physical positions of the RF antennas within the array.

36. The method of claim 33, wherein the varied configuration parameters of the array include varying polarizations of the RF antennas within the array.

37. The method of claim 32, wherein the non-linear components of the non-linear RF receiver have varied non-linear component configuration parameters and the varied non-linear component configuration parameters reduces an amount of re-radiated RF energy in the multiple waves.

38. The method of claim 37, wherein the varied non-linear component configuration parameters of the non-linear components include varying arrangements of the non-linear components in the non-linear RF receiver to create a varied arrangement of the non-linear components in the non-linear RF receiver to reduce the amount of re-radiated RF energy in the multiple waves.

39. The method of claim 38, wherein the varied arrangement include varying polarities of the non-linear components in the non-linear RF receiver.

40. The method of claim 37, wherein the varied non-linear component configuration parameters of the non-linear components include varying matchings between the non-linear components and the RF antennas in the array to create varied matchings between the non-linear components and the RF antennas in the array to reduce the amount of re-radiated RF energy in the multiple waves.

41. The method of claim 40, wherein the varied matchings includes varying lengths of transmission lines coupling the non-linear components and the RF antennas in the array.

42. The method of claim 32, wherein the re-radiated RF energy from the incident RF energy is created from either or both harmonics generated by processing the incident RF energy at the non-linear components in the non-linear RF receiver or intermodulation of signals generated by processing the incident RF energy of different frequencies at the non-linear components in the non-linear RF receiver.

43. The method of claim 26, wherein the incident RF energy is received by the RF antennas in the array as propagating radio waves in the form of one or a combination of a continuous wave, modulated waves, pulsed waves, time-harmonic waves, and time-varying waves.

* * * * *